United States Patent [19]

Yamashita et al.

[11] Patent Number: 6,136,893
[45] Date of Patent: Oct. 24, 2000

[54] METHOD FOR CONCENTRATING AQUEOUS DISPERSION OF FLUORINE-CONTAINING POLYMER

[75] Inventors: Masanori Yamashita; Toshiro Miura; Shinji Murakami; Shoji Kawachi; Tadao Hayashi; Kazutaka Hosokawa, all of Settsu, Japan

[73] Assignee: Daikin Industries, Ltd., Osaka, Japan

[21] Appl. No.: 09/171,123

[22] PCT Filed: Feb. 4, 1998

[86] PCT No.: PCT/JP98/00452

§ 371 Date: Oct. 13, 1998

§ 102(e) Date: Oct. 13, 1998

[87] PCT Pub. No.: WO98/36017

PCT Pub. Date: Aug. 20, 1998

[30] Foreign Application Priority Data

Feb. 13, 1997 [JP] Japan ................................. 9-028911
May 12, 1997 [JP] Japan ................................. 9-121186

[51] Int. Cl.[7] ........................................................ C08L 3/00
[52] U.S. Cl. ................................................................ 523/310
[58] Field of Search ................................................ 523/310

[56] References Cited

U.S. PATENT DOCUMENTS 4,369,266  1/1983  Kuhls ...................................... 523/332

FOREIGN PATENT DOCUMENTS 48-37575    11/1973   Japan .
52-147648   12/1977   Japan ................................. C08J 3/02
2-34971      8/1990   Japan ................................. C08J 3/02

*Primary Examiner*—Paul R. Michl
*Attorney, Agent, or Firm*—Sughrue, Mion, Zinn, Macpeak & Seas, PLLC

[57] ABSTRACT

To provide the method for concentrating an aqueous dispersion of fluorine-containing polymer particles containing a surfactant, which is applicable to a fluorine-containing polymer such as PTFE being easily fibrilated and assures low energy, low cost and short term concentration only by using various kinds of surfactants in a small amount. The method for concentrating an aqueous dispersion of fluorine-containing polymer particles containing the surfactant by feeding the aqueous dispersion of fluorine-containing polymer particles containing the surfactant in an amount of 2.0 to 8.0% by weight based on a solid content of the fluorine-containing polymer to a micro filtration membrane having a pore size of 0.01 to 1 μm with aqueous dispersion feeding means which does not substantially generate shearing force and then removing an aqueous medium containing the surfactant from the aqueous dispersion.

11 Claims, 3 Drawing Sheets

METHOD FOR CONCENTRATING AQUEOUS DISPERSION OF FLUORINE-CONTAINING POLYMER

TECHNICAL FIELD

The present invention relates to a method for concentrating aqueous dispersion of fluorine-containing polymer such as polytetrafluoroethylene (PTFE) by micro filtration membrane.

BACKGROUND ART

An aqueous emulsion of PTFE is prepared by emulsion-polymerizing a tetrafluoroethylene monomer in the presence of an aqueous polymerization initiator and fluorine-containing emulsifying agent (for example, U.S. Pat. No. 2,559,752). Fluorine-containing polymers other than PTFE are also prepared by nearly the same process, and a solid content thereof is usually from 5 to 45% by weight. In case of industrial uses such as coatings and binders for batteries, an aqueous dispersion having a high concentration (for example, about 60% by weight) is demanded. However it is difficult to obtain a high concentration simply by adding an additional amount of fluorine-containing polymer, and such a high concentration is usually achieved by concentrating procedure.

For example, U.S. Pat. No. 2,478,229 discloses a method for concentrating aqueous dispersion of fluorine-containing polymer by using anionic surfactant. However that method has not been practically adopted since there is a problem that when making the surfactant insolubilized by adding a large amount of electrolyte, a part of PTFE particles causes an avoidable irreversible coagulation.

Also a method of using nonionic surfactant disclosed in U.S. Pat. No. 3,037,953 can give an aqueous dispersion having a relatively high concentration without causing coagulation of PTFE particles and has been commercialized. However the defects of that method are such that since a large amount of a specific surfactant having the limited cloud point range (commonly 20° to 80° C.) is used and after the concentration, the surfactant (hydrophilic portion) having a deviated molecular weight distribution has to be wasted from a supernant liquid, a large material cost is necessary in raw materials, and such that since a large heat energy consumption and long-time process steps are required, the efficiency of the process is not good.

Further in a method of concentration by evaporation disclosed in U.S. Pat. No. 3,316,201, since the resulting concentrated dispersion contains an aqueous polymerization initiator and fluorine-containing emulsifying agent at high concentration which are used in polymerization reaction, there is a defect that viscosity of the aqueous dispersion is sensitively changed with its temperature. In addition, in case of an aqueous dispersion having poor dispersion stability such as aqueous dispersion of PTFE, primary particles easily cause coagulation during the concentrating step to break emulsion state.

In an electric decantation method disclosed in GB 642,025, since the resulting coagulated particles adhere to an electrode to obstruct the passing of electric current, concentration effect is very low with a large amount of electric energy consumption. Thus that method is not suitable for practical use.

On the contrary, there is proposed a membrane separation method which employs an ultrafilter membrane (UF membrane) having a pore size up to 0.5 time the minimum particle size of fluorine-containing polymer particles (JP-B-2-34971, U.S. Pat. No. 4,369,266). This membrane separation method employing UF membrane has been used for filtration of high molecular weight materials, and also in the concentration of an aqueous dispersion of fluorine-containing polymer, has merits such as low energy consumption and low cost, use of various surfactants and a reduced amount of the surfactant.

However in the membrane separation method employing UF membrane, there are problems to be solved such that: ① since a separable molecular weight of UF membrane is as small as from about 1,000 to hundreds of thousands (not more than 0.01 μm in pore size), desired filtrating performance cannot be obtained unless filtration pressure is adjusted to about 1 MPa. Also filtration speed is low and when liquid flow rate is increased, the UF membrane is clogged with the fluorine-containing polymer particles, and ② since an aqueous dispersion has to be fed forcedly to the UF membrane and a fluorine-containing polymer, particularly PTFE is fibrilated by mechanical shearing force, in case of using a pump having mechanically movable mechanism, the polymer is fibrilated by a shearing force generated at the moving parts or sealing parts of the pump, which causes a trouble that passage of the dispersion and the UF membrane are clogged with the resulting fibrilated product.

According to technique disclosed in JP-B-2-34971, the problem of the above ② is intended to be solved by using a pump which keeps the fluorine-containing polymer particles off mechanical parts causing friction e.g. a peristalic pump or preferably a centrifugal pump. However even by the use of a centrifugal pump which is considered to be preferable in the above-mentioned patent publication, a shearing force is generated at rotating parts and the technique does not give substantial solution.

An object of the present invention is to provide a method for concentration which makes improvements on the problems of above ① such as high filtrating pressure, low filtration speed and long filtration time and can solve the problem with the fibrilation of the above ② while maintaining such merits of the UF membrane separation method that kind of surfactants is not limited and an amount of the surfactant can be decreased, and further improving its low energy consumption and low cost.

DISCLOSURE OF THE INVENTION

Namely the present invention relates to a method for concentrating an aqueous dispersion of fluorine-containing polymer particles by feeding the aqueous dispersion of fluorine-containing polymer particles containing a surfactant to a micro filtration membrane having a pore size of 0.01 to 1 μm, preferably 0.05 to 0.5 μm with aqueous dispersion feeding means which does not substantially generate shearing force and then removing an aqueous medium containing the surfactant from the above-mentioned aqueous dispersion by means of the micro filtration membrane.

In the present invention, the pore size means a minimum particle size of the polymer particle which does not pass through the membrane.

The pore size of the micro filtration membrane is preferably selected in the range of 0.2 to 1.5 times the average particle size of the polymer particles.

It is preferable that the aqueous dispersion of fluorine-containing polymer particles is flowed in parallel with a surface of the micro filtration membrane by so-called tangential flow filtration (TFF) method.

With respect to the aqueous dispersion feeding means, it is preferable to generate a force for feeding the aqueous dispersion by applying a static pressure thereto and it is particularly preferable to generate the force for feeding by putting the aqueous dispersion in an airtightly closed vessel and pressurizing the dispersion with compressed clean air or inert gas.

In case where the fluorine-containing polymer is PTFE, the pore size of the micro filtration membrane is preferably from 0. 1 to 0.3 µm.

Also the present invention relates to a method for concentrating an aqueous dispersion of fluorine-containing polymer particles containing a surfactant, which comprises, in a first closed vessel and a second closed vessel which are communicated with each other through a micro filtration membrane, repeating alternately the following steps until a desired concentration of the aqueous dispersion is obtained;

a step for feeding the aqueous dispersion of fluorine-containing polymer particles containing the surfactant from the first closed vessel to the second closed vessel with aqueous dispersion feeding means which does not substantially generate shearing force and a step for feeding the aqueous dispersion from the second closed vessel to the first closed vessel with the aqueous dispersion feeding means.

BEST MODE FOR CARRYING OUT THE INVENTION

Features of the concentration method of the present invention are that the membrane separation is carried out preferably by the TFF method with a micro filtration membrane having a pore size of 0.2 to 1.5 times, preferably 0.6 to 1.0 time the average particle size of polymer particles; and as the means for feeding the above-mentioned aqueous dispersion of fluorine-containing polymer particles, there is employed the means which does not substantially generate a shearing force, for example, means for putting the aqueous dispersion in a closed vessel and then applying pressure to the dispersion with compressed inert gas is adopted.

A basic concept of one embodiment of a system realizing the above-mentioned concentration method of the present invention is explained below according to the schematic flow chart of FIG. 1.

Figure 1:
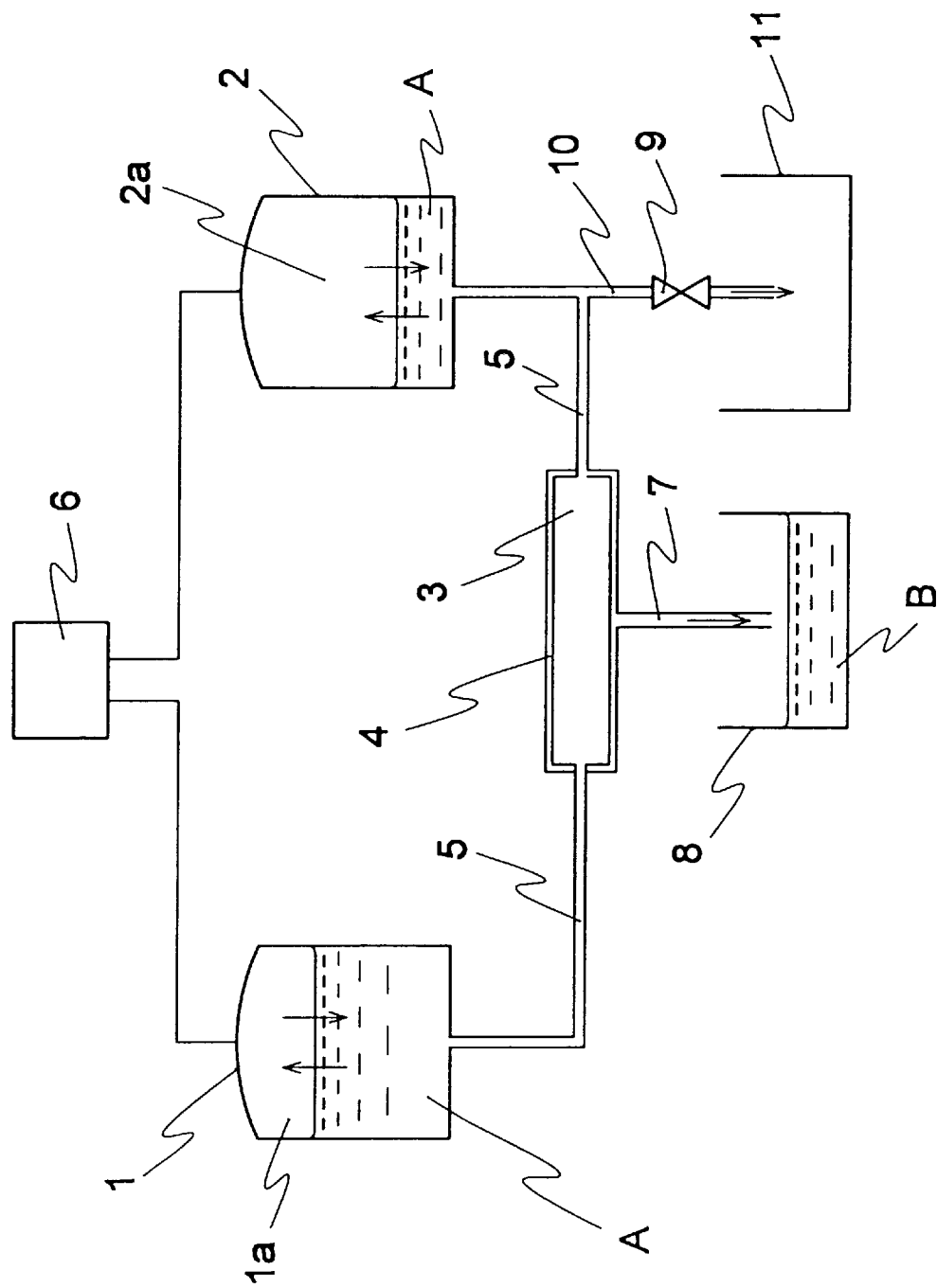
FIG. 1 is a schematic flow chart for explaining the method for concentration of the present invention.

In FIG. 1, numerals 1 and 2 represent the first and second closed vessels, respectively for storing the aqueous dispersion of fluorine-containing polymer before the concentration, and the vessels are communicated with each other through a pipe 5 and a filter apparatus 4 having a micro filtration membrane 3. Both of an upper part 1a of the first closed vessel 1 and upper part 2a of the second closed vessel 2 are connected to an air pump 6. On the micro filter apparatus 4 is provided a pipe 7 for drawing out a separated aqueous medium B containing a surfactant. The separated aqueous medium B is put in a vessel 8. Also on way of the pipe 5 is provided a pipe 10 for drawing out the concentrated aqueous dispersion of fluorine-containing polymer through a valve 9. The concentrated aqueous dispersion is preserved in a vessel 11.

In the concentrating operation, firstly an aqueous dispersion A to be concentrated is introduced into the first closed vessel 1 (or may be introduced into the second closed vessel 2) and clean compressed air is supplied into the upper part 1a of the first closed vessel 1 with the air pump 6. At that time, the upper part 2a of the second closed vessel 2 is left open to the air through a reducing valve (not shown), and the valve 9 for drawing out the concentrated aqueous dispersion is closed. The aqueous dispersion A to be concentrated in the first closed vessel 1 is fed to the micro filtration membrane 3 in the micro filter apparatus 4 with the compressed air, and there the aqueous medium B containing a surfactant is separated and passes through the pipe 7 to be preserved in the vessel 8.

The concentrated aqueous dispersion having passed through the micro filter apparatus 4 is, when concentrated to a desired concentration by one filtration step, drawn out into the vessel 11 through the pipe 10 by opening the valve 9.

In case where the concentration of the concentrated aqueous dispersion at the outlet of the micro filter apparatus 4 is not a desired one, the valve 9 is left closed and the aqueous dispersion is fed to the second closed vessel 2. When almost all of the aqueous dispersion A to be concentrated in the first closed vessel 1 was transferred to the second closed vessel 2, the compressed air filled in the first closed vessel 1 is released, and the inside of the first closed vessel 1 is restored to the atmospheric pressure and at the same time, compressed air is supplied to the upper part 2a of the second closed vessel 2 with the air pump 6. Thus the inside of the second closed vessel 2 is pressurized with the compressed air to return the aqueous dispersion A to the micro filter apparatus 4 to carry out the concentration by filtration.

These operations are repeated until the desired concentration is obtained, and finally the valve 9 is opened to draw out the concentrated dispersion of fluorine-containing polymer into the vessel 11 through the pipe 10.

Preferred operating conditions for the filtration method of the present invention are as follows.

(1) Temperature: 20° to 40° C., usually 20° to 25° C.

The filtration can be carried out at room temperature, and neither coloring by heating nor lowering of dispersion stability of the aqueous dispersion arises. Also energy consumption can be reduced.

(2) Method for feeding aqueous dispersion to micro filtration membrane

As a method for feeding the aqueous dispersion to the micro filtration membrane, there are a dead end filtration method for feeding the aqueous dispersion vertically to the membrane and a tangential flow filtration method (TFF) for feeding the aqueous dispersion in parallel with the membrane. In the present invention, though the both methods can be used, TFF is preferred from the point that clogging of pores of the membrane hardly occurs and the feeding of the aqueous dispersion can be carried out at relatively low pressure.

(3) Filtration pressure

The filtration pressure is represented by an average pressure of an inlet pressure of the membrane (hereinafter also referred to as "Pin") and an outlet pressure of the membrane (hereinafter also referred to as "Pout").

The average filtration pressure is, in case of the tangential flow filtration (TFF), from 0.01 MPa to 0.3 MPa, preferably from 0.1 MPa to 0.2 MPa. When the average filtration pressure is too high, coagulation of the particles tends to occur easily, and when too low, efficiency of the filtration tends to be lowered remarkably. The filtration pressure is an important element for determining not only the concentrating speed, but also the feeding rate of the aqueous dispersion to the filtration membrane. Usually in the method employing the circulation pump, since the pump performance is limited, the filtration pressure is restricted by the circulation flow rate of the aqueous dispersion (in other words, when the circulation flow rate is increased, the filtration pressure has to be set at a low pressure). In the present system, since the feeding flow rate of the aqueous dispersion is set by the differential pressure of the closed vessels, the filtration pressure is not affected by the feeding flow rate of the aqueous dispersion and can be set freely.

(4) Means for feeding aqueous dispersion

There can be employed means which does not substantially give a shearing force to the aqueous dispersion, for example, means for applying a pressure to the dispersion with clean air or inert gas. Means for feeding the aqueous dispersion which has movable parts such as pumps cannot be used, because the movable parts generate friction force to produce shearing force more or less. Examples of the inert gas are nitrogen gas, etc. From the viewpoint of cost, clean air is preferable.

In case where pressure is applied with the compressed air, a pressure to be applied may be determined so that the filtration pressure becomes an average pressure of the above-mentioned inlet pressure and outlet pressure of the membrane.

(5) Flow rate of aqueous dispersion to micro filtration membrane

The flow rate of the aqueous dispersion varies depending on kind and pore size of the micro filtration membrane and the aqueous dispersion feeding method. Usually it is preferable to set a linear velocity at 0.5 to 7 m/sec, more preferably 1 to 3 m/sec in the tangential flow filtration (TFF). The flow rate of the aqueous dispersion is set by a differential pressure of the feeding vessel of the aqueous dispersion and the receiving side vessel.

(6) Pore size

In the micro filtration membrane used in the present invention, it is advantageous to make the pore size smaller from the point that it is possible to filtrate the dispersion containing particles having a smaller particle size. However if the pore size is too small, it is disadvantageous from the point that the filtration pressure becomes high and the filtration speed is lowered. On the contrary, when the pore size is larger, it is advantageous from the point that the filtration pressure is low and the filtration time is short. However when the pore size is too large, there is a problem that fluorine-containing polymer particles having a small particle size pass through the membrane. Therefore in principle the pore size is 0.2 to 1.5 times, preferably 0.6 to 1.0 time the average particle size of the fluorine-containing polymer particles.

The aqueous dispersion to be concentrated by the method of the present invention is an aqueous dispersion containing fluorine-containing polymer particles. The fluorine-containing polymer may be one which forms a stable aqueous dispersion by adding a surfactant.

Examples of the fluorine-containing polymer are fluorine-containing resins such as PTFE (including a modified PTFE containing 0.001 to 1.0% by weight of other monomer such as hexafluoropropene, chlorotrifluoroethylene, perfluoro(alkyl vinyl ether), trifluoroethylene, perfluoroalkylethylene or perfluoro(alkoxy vinyl ether)), low molecular weight PTFE, tetrafluoroethylene-perfluoro(alkyl vinyl ether) copolymer (PFA), tetrafluoroethylene-hexafluoropropylene copolymer (FEP), polyvinylidene fluoride (PVdF), ethylene-chlorotrifluoroethylene copolymer (ECTFE) and polychlorotrifluoroethylene (PCTFE); fluorine-containing elastomers such as vinylidene fluoride-hexafluoropropylene elastomer, vinylidene fluoride-tetrafluoroethylene-hexafluoroethylene elastomer, vinylidene fluoride-chlorotrifluoroethylene elastomer, tetrafluoroethylene-ethylene elastomer, tetrafluoroethylene-propylene elastomer, hexafluoropropylene-ethylene elastomer, fluoro(alkyl vinyl ether)-olefin elastomer and fluorophosphazene rubber; and the like. Among them, the concentration of PTFE (including a modified PTFE) was particularly difficult since PTFE is easy to be filtrated.

As mentioned above, these fluorine-containing polymers are obtained as an emulsion polymerization product having an average particle size of about 0.01 $\mu$m to about 0.5 $\mu$m.

Example of the aqueous medium for the aqueous dispersion is water which may contain various water soluble organic solvents such as ethylene glycol and toluene.

The aqueous dispersion of fluorine-containing polymer to be concentrated according to the method of the present invention contains a surfactant in an amount of 2.0 to 8.0% by weight, preferably 4.0 to 7.0% by weight based on the polymer as mentioned above. This amount of the surfactant is a remarkably decreased amount because in the above-mentioned prior cloud point method, a large amount of surfactant (about 10 to 13% by weight) must be used. Kind of the surfactant is not particularly limited. As far as dispersion stability is obtained, any of anionic, cationic, nonionic and ampholytic surfactants can be used, and various kinds of the aqueous dispersion of fluorine-containing polymer can be prepared.

For example, in case of a nonionic surfactant, as mentioned above, since the method of the present invention is not affected by a cloud point of the surfactant, a compound selected within a wide molecular weight range can be used. When using a compound having a low molecular weight, in the coating or impregnation process, it is possible to adopt a relatively low drying temperature and thermally decompose the surfactant for a very short time at a high temperature and also it is possible to prevent a coated article from coloring due to decomposition products of the surfactant. On the other hand, when a surfactant having a slightly high molecular weight and a high cloud point, even at a high temperature in summertime, storage stability of products can be enhanced.

When an anionic surfactant is used, it is possible to provide an aqueous dispersion of PTFE used, as a coating material, for Mash method (method for obtaining a water-containing paste by coagulating an aqueous dispersion of PTFE with a coagulating agent) which is employed for producing an oilless bearing.

Cationic and ampholytic surfactants offer the same effects that it is possible to decrease a processing temperature of the aqueous dispersion of fluorine-containing polymer and prevent a coated article from coloring due to decomposition products of the surfactant.

Examples of each surfactant are as follows.

(Anionic surfactant)

Higher fatty acid salts such as mixed fatty acid soda soap, oleic acid potash soap, castor oil potash soap, semi-hardening beef tallow fatty acid soda soap and semi-hardening beef tallow fatty acid potash soap; salts of alkylsulfates such as sodium laurylsulfate, sodium higher alcohol sulfate, triethanolamine laurylsulfate and ammonium laurylsulfate; salts of alkylbenzenesulfonate such as sodium dodecylbenzenesulfonate; salts of alkylnaphthalenesulfonate such as sodium alkylnaphthalenesulfonate; salts of dialkylsulfosuccinate such as sodium dialkylsulfosuccinate; salts of alkyldiallylethersulfonate such as sodium alkyldiphenyletherdisulfonate; salts of alkylphosphates such as diethanolamine alkylphosphate and potassium alkylphosphate; naphthalenesulfonate and formaldehyde condensation products such as sodium salt of β-naphthalenesulfonate and formaldehyde condensation product; aromatic sulfonate and formaldehyde condensation products such as sodium salt of aromatic sulfonate and formaldehyde condensation product; and salts of polyoxyethylene alkyl and alkylallyl ether sulfates such as sodium polyoxyethylene lauryl ether sulfate, sodium polyoxyethylene alkyl ether sulfate and sodium polyoxyethylene alkyl phenyl ether sulfate.

(Nonionic surfactant)

Polyoxyethylene alkyl ethers (ethyleneoxide moiety may be partly replaced by propyleneoxide moiety) such as polyoxyethylene lauryl ether, polyoxyethylene cetyl ether, polyoxyethylene stearyl ether, polyoxyethylene oleyl ether and polyoxyethylene higher alcohol ether; polyoxyethylene alkyl phenyl ethers (a part of ethyleneoxide moiety may be block moiety with propyleneoxide moiety) such as polyoxyethylene octyl phenyl ether and polyoxyethylene nonyl phenyl ether; oxyethylene-oxypropylene block polymer; sorbitan fatty acid esters such as sorbitan laurate, sorbitan palmitate, sorbitan stearate and sorbitan oleate; fatty acid esters of polyoxyethylene sorbitan such as lauryl ester, palmityl ester, stearyl ester and oleyl ester of polyoxyethylene sorbitan; monoglycerides of fatty acids such as stearic acid and oleic acid; fatty acid esters of polyethylene glycol such as lauryl ester, stearyl ester and oleyl ester of polyethylene glycol; and polyoxyethylene alkylamines such as polyoxyethylene laurylamine and polyoxyethylene stearylamine; and derivatives thereof.

(Cationic surfactant)

Alkylamine salts such as coconut amine acetate, stearylamine acetate, coconut amine hydrochloride, stearylamine hydrochloride and stearylamine oleate; and quaternary ammonium salts such as lauryltrimethylammonium chloride, stearyltrimethylammonium chloride, distearyldimethylammonium chloride and alkylbenzyldimethylammonium chloride.

(Ampholytic surfactant)

Alkyl betaines such as lauryl betaine, coconut betaine and stearyl betaine; amine oxide such as lauryldimethylamine oxide; and imidazolinium betaine such as laurylcarboxymethylhydroxyethyl imidazolinium betaine.

With respect to the micro filtration membrane used in the micro filter apparatus, a known or commercially available micro filtration membrane can be used as it is as far as it has capability of retaining primary particles of fluorine-containing polymer without passing them. Non-restricted examples of the membrane material are, for instance, synthetic resins such as nylon, polypropylene, polyether sulfone, fluorine-containing resin and polyester; semi-synthetic resins such as cellulose acetate; ceramics such as glass fiber, porous glass and high purity alumina; and the like. Among them, a membrane made of ceramics is preferred for preventing the membrane from cloggging because the resulting accumulated fluorine-containing polymer particles adhered to the membrane can be back-washed at high pressure and also is most advantageous from the viewpoints of mechanical strength and durability.

The filtration membrane may be in any form such as film (flat membrane), tubular form (in the form of hose) and multitubular form. The tubular form (in the form of hose) and multitubular form are advantageous since a membrane area available for passing liquid can be made wide. A module is constructed by installing several of these units (elements) in a housing, and one or a plurality of the modules are used. Particularly it is efficient to connect a plurality of modules in parallel or in series with respect to a circulation system.

Among fluorine-containing polymers, PTFE is easily fibrilated when a shearing force is applied. Thus the filtration of PTFE was very difficult and the concentration had to be carried out by conventional methods such as the cloud point method. In consideration of such characteristics of PTFE, the above-mentioned JP-B-2-34971 proposes that "a pump which can keep PTFE in the state of not being in contact with parts which generate friction force" is used. However in fact such a pump does not exist, and when a dispersion is passed through moving parts such as mechanically rotating parts or sealing parts, shearing force arises unavoidably in the dispersion and fibrilated PTFE particles are produced. When passing an aqueous dispersion containing such fibrilated PTFE particles through a micro filtration membrane having a relatively large pore size, the fibrilated PTFE particles accumulate on the membrane to clog the membrane.

Therefore in the present invention, in the particular case where the fluorine-containing polymer is PTFE (including the modified PTFE), it is desirable to use the aqueous dispersion feeding means which is not provided with a moving part and sealing part and thus does not substantially apply a shearing force to PTFE. The above-mentioned means is preferably employed as the aqueous dispersion feeding means which does not substantially apply a shearing force to the dispersion.

Figure 2:
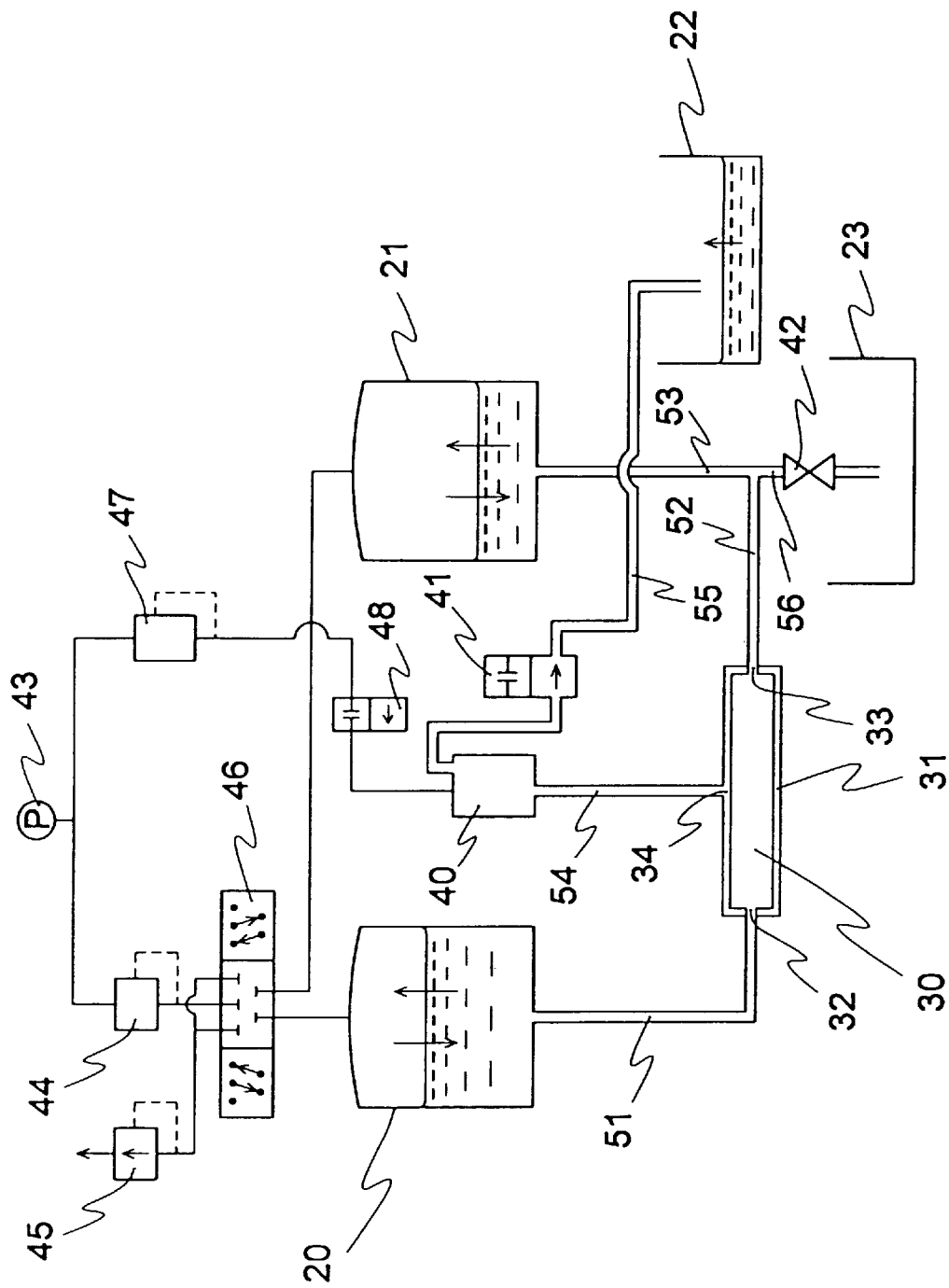
FIG. 2 is a flow chart of a practical concentrating system for carrying out the method for concentration of the present invention.

Then one embodiment of more preferred apparatuses for achieving the concentration method of the present invention is explained according to the schematic flow chart of FIG. 2.

The closed vessel mentioned below is an airtightly closed vessel which is not provided with anything except pipings and flanges which are not open in normal state. A micro filter apparatus 31 containing a micro filtration membrane(s) 30 made of ceramic is located between a first closed vessel 20 and a second closed vessel 21 and is connected to the vessels 20 and 21 with dispersion feeding pipes 51, 52 and 53. The vessels can store an aqueous dispersion of fluorine-containing polymer to be concentrated and have the same volumetric size. As illustrated, the both sides 32 and 33 of the ceramic micro filtration membrane 30 are connected to the dispersion feeding pipes 51 and 52, respectively so as not to cause leakage of the dispersion. The both sides 32 and 33 are communicated with each other through one or several through-holes (not shown) in the form of straight tube provided inside the ceramic micro filtration membrane 30. The through-holes are communicated with the outside of the ceramic micro filtration membrane 30 through micro pores and also to the outlet 34 of the micro filter apparatus 31. The outlet 34 and the closed type vessel 40 for back washing are communicated with each other through a dispersion feeding pipe 54. Further the back washing vessel 40 is communicated with an open vessel 22 through a dispersion feeding pipe 55. On the pipe 55 is provided an on-off type solenoid valve 41 for the dispersion which is open when electrically turned off.

A dispersion feeding pipe 56 provided with a valve 42 which is normally closed is connected to a concentrated dispersion receiving vessel 23 from a junction of the pipes 52 and 53. The dispersion feeding pipe 56 can be provided at the side of the pipe 51. The valve 42 is opened after completion of the concentration.

Next the elements for applying an air pressure are explained below.

As illustrated, the compressed air to be supplied from which contaminants were eliminated to a necessary extent is supplied from a compressed air source 43 to the first closed vessel 20 and the second closed vessel 21 through a pressure regulating valve 44 for applying pressure, a pressure regulating valve 45 for residual pressure and a direction changing solenoid valve 46. An air for back washing which is branched from the compressed air source 43 is supplied to the back washing vessel 40 through a pressure regulating valve 47 and an on-off change-over valve 48 which is closed when electrically turned off.

Then operations of the concentration system are explained below.

In the initial state, an aqueous dispersion is not in all the vessels 20, 21, 22, 23 and 40 and the micro filter apparatus 331. A virgin dispersion to be concentrated is fed into one storage vessel and the vessel is sealed. In the following explanation, the virgin dispersion is put in the first closed vessel 20 and the vessel is sealed, but alternatively the virgin dispersion may be put in the second closed vessel 21. In that state, all the pressure regulating valves have been set at given pressures. For example, it is desirable that the pressure regulating valves 44, 45 and 47 are set at about 0.17 MPa, about 0.13 MPa and about 0.4 MPa, respectively.

When the direction changing solenoid valve 46 is switched so as to supply air into the closed vessel 20, a pressure inside this vessel becomes higher than that of the second closed vessel 21. Therefore the dispersion in the first closed vessel 20 moves to the second closed vessel 21. The air in the second closed vessel 21 is released into the atmosphere through the pressure regulating valve 45 for adjusting the inside pressure. While the dispersion moves from the first closed vessel 20 to the second closed vessel 21, a pressure higher than the atmospheric pressure is applied to the inside of the micro filtration membrane 30, and thus only a filtrate containing a surfactant which passed through the micro pores flows into the back washing vessel 40. When the vessel 40 is filled with the filtrate, the filtrate flows into the open vessel 22 through the filtrate feeding pipe 55. An amount of the dispersion flowing into the second closed vessel 21 decreases by an amount having passed through the micro pores, thus the aqueous dispersion is concentrated.

When the residual amount of the dispersion in the first closed vessel 20 reaches a given value, it is detected with a level meter and a float sensor. When the given amount is detected, the direction changing solenoid valve 46 is switched to the reverse direction. Since a pressure in the second closed vessel 21 becomes higher, the aqueous dispersion flows into the first closed vessel 20 from the second closed vessel 21. Also in this case, in the same way as explained above, the flow into the back washing vessel 40 occurs. When the residual amount of the dispersion in the second closed vessel 21 reaches a given value, the direction changing solenoid valve 46 is switched to the reverse direction. It is desirable that the switching is repeated until an amount of the liquid containing a surfactant stored in the open vessel 22 reaches a given value. When the desired concentration was carried out (namely when the liquid amount in the vessel 22 reaches a given value), the valve 42 is opened to draw out the concentrated aqueous dispersion of fluorine-containing polymer into the vessel 23.

In the next place, back washing method of the micro filtration membrane is explained below.

In normal state where the back washing operation is not carried out, the on-off change-over solenoid valve 41 is open and the on-off change-over solenoid valve 48 is in the closed position. In order to carry out the back washing, these valves are actuated nearly at the same time, namely the change-over solenoid valve 41 is closed and the change-over solenoid valve 48 is opened. Since the pressure regulating valve 47 for back washing is set at a pressure higher than other pressure regulating valves, an air flows into the closed back washing vessel 40, and with this air pressure, the liquid containing a surfactant in the closed vessel 40 backflows through the micro pores of the micro filtration membrane 30, then washing the inside of the membrane 30. It is desirable that these solenoid valves are actuated only for about 1 second necessary for the back washing and that independently from the switching of the above-mentioned change-over solenoid valve 46, the actuating of the valves for back washing is carried out at a given interval of 10 to 1,000 times the period of time taken for back washing.

EXAMPLE

The concentration method of the present invention is then explained based on Examples and Comparative Examples, but the present invention is not limited to those Examples.

Example 1

Tetrafluoroethylene monomer was stirred in a water soluble polymerization initiator and an aqueous dispersion of fluorine-containing emulsifying agent to be polymerized under pressure, thus giving an aqueous dispersion of PTFE. This aqueous dispersion of the emulsified polymer contained about 30% by weight of PTFE (average particle size: about 0.28 μm, standard specific gravity: 2.189) based on the liquid weight. About 7% by weight of polyoxyethylene alkyl phenyl ether (trade name: Triton X-100 available from Union Carbide Co., Ltd.) was added to the aqueous dispersion based on a weight of a polymer solid content, and pH was adjusted to be 9.5 with aqueous ammonia.

The standard specific gravity (SSG) was measured by water displacement method (specific gravity measuring method) by using a sample formed according to ASTM D4895-89.

About 20 liters (24 kg) of the aqueous dispersion was concentrated with the concentrating system shown in FIG. 2. As the micro filtration membrane 30, a micro filtration membrane module made of ceramic and having a pore size of 0.2 μm (pore size/average particle size=0.71) (trade name: Ceraflo MSDNO4020 available from Mikuni Kikai Co., Ltd.) was used so that the tangential flow filtration was carried out. The aqueous dispersion was put in the closed vessel 20, and transferred to the another vessel with the compressed air so that the average filtration pressure becomes about 0.15 MPa (Pin=0.17 MPa, Pout=0.13 MPa). In this case, the aqueous dispersion of PTFE was filtrated through the micro filtration membrane 30 and about 2.2% by weight of the filtrate containing a surfactant was obtained. After transferring to another vessel, pressurizing of the empty vessel 20 was stopped and the inside pressure was released. Then a pressure inside the vessel 21 containing the aqueous dispersion of PTFE was increased with the compressed air and the aqueous dispersion was flowed to the vessel 20 through the micro filtration membrane 30. This operation was repeated until the PTFE concentration calculated with an amount of the filtrate reaches about 60% by weight, and thus a concentrated dispersion was obtained. The obtained concentrated dispersion contained no coagulated and fibrilated products. The micro filtration membrane 30 was not clogged since the back washing was carried out for 0.5 second at an interval of one minute by using the filtrate and air compressed to about 0.4 MPa.

An average flow rate of the aqueous dispersion of PTFE to the micro filtration membrane was about 10 liters/minute (linear velocity: 1.1 m/sec), and the period of time taken for the concentration was about 5.5 hours.

The average particle size of the polymer particles of the present invention was obtained by measuring particle sizes of 100 particles by using a scanning type electron microscope available from Hitachi, Ltd and then taking an average thereof.

Example 2

Micro filtration was carried out with about 20 liters (24 kg) of an aqueous dispersion of PTFE in the same manner as in Example 1 except that the two micro filtration membrane modules made of ceramic were connected in parallel to give a concentrated dispersion having a concentration of PTFE of about 60% by weight. No coagulated and fibrilated products were seen in the concentrated dispersion. An average flow rate of the aqueous dispersion of PTFE to the micro filtration membrane was about 20 liters/minute (linear velocity: 1.1 m/sec), and the period of time taken for the concentration was about 2 hours and 40 minutes.

Example 3

Micro filtration was carried out with about 20 liters (24 kg) of an aqueous dispersion of PTFE in the same manner as in Example 1 except that the average filtration pressure was adjusted to about 0.05 MPa (Pin=0.08 MPa, Pout=0.02 MPa) and the average flow rate of the aqueous disperion of PTFE to the micro filtration membrane was adjusted to about 20 liters/minute (linear velocity: 2.2 m/sec) to give a concentrated dispersion having a concentration of PTFE of about 60% by weight. No coagulated and fibrilated products were seen in the concentrated dispersion. The period of time taken for the concentration was about 5 hours.

Example 4

Micro filtration was carried out with about 20 liters (24 kg) of an aqueous dispersion of PTFE in the same manner as in Example 1 except that the average filtration pressure was adjusted to about 0.10 MPa (Pin=0.12 MPa, Pout=0.08 MPa) and the average flow rate of the aqueous disperion of PTFE to the micro filtration membrane was adjusted to about 15 liters/minute (linear velocity: 1.7 m/sec) to give a concentrated dispersion having a concentration of PTFE of about 60% by weight. No coagulated and fibrilated products were seen in the concentrated dispersion. The period of time taken for the concentration was about 5 hours.

Example 5

Micro filtration was carried out with about 20 liters (24 kg) of an aqueous dispersion of PTFE in the same manner as in Example 1 except that the average filtration pressure was adjusted to about 0.20 MPa (Pin=0.21 MPa, Pout=0.19 MPa) and the average flow rate of the aqueous disperion of PTFE to the micro filtration membrane was adjusted to about 5 liters/minute (linear velocity: 0.5 m/sec) to give a concentrated dispersion having a concentration of PTFE of about 60% by weight. No coagulated and fibrilated products were seen in the concentrated dispersion. The period of time taken for the concentration was about 7 hours.

Comparative example 1

Concentration of 600 g of an aqueous dispersion of PTFE was carried out in the same manner as in Example 1 except that instead of the micro filtration membrane 30, an ultra-filter membrane (nominal separable molecular weight: 300,000, PTMKOMS10 made of polyether sulfone and available from Nippon Millipore Co., Ltd.) was used (pore size/average particle size=$2.5 \times 10^{-2}$). The average filtration pressure was adjusted to about 0.5 MPa (Pin=0.6 MPa, Pout=0.4 MPa) and the average flow rate of the aqueous disperion of PTFE to the ultrafilter membrane was adjusted to about 0.3 liter/minute. The operation was carried out for about one hour. With a lapse of time, the filtration membrane was clogged due to an accumulated PTFE particles and the filtration became impossible. Therefore the concentration was stopped. In the aqueous disperion of PTFE (virgin dispersion), coagulated products were recognized. A concentrated dispersion was obtained in an amount of only about 40 g, and almost no concentration had been achieved.

Comparative example 2

Concentration was carried out with the ultrafilter membrane in the same manner as in Comparative Example 1 except that the average filtration pressure was decreased to about 0.15 MPa. As a result, almost no concentrated dispersion was obtained, and almost no concentration had been achieved.

Figure 3:
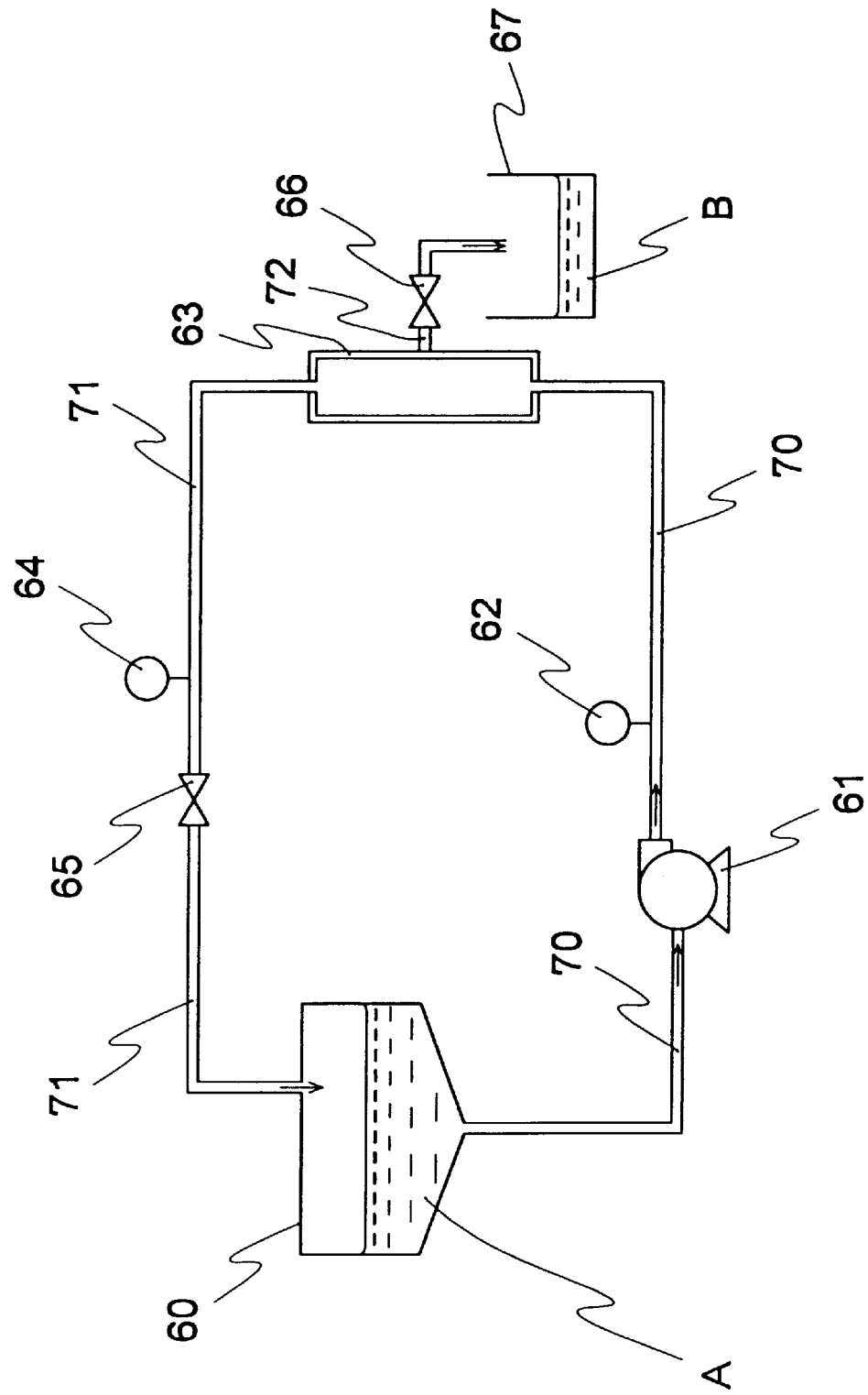
FIG. 3 is a flow chart of a practical concentrating system for carrying out Comparative Example to the present invention.

The following Comparative Example 3 was carried out by using a concentrating system shown in FIG. 3.

In the concentrating system shown in FIG. 3, a virgin dispersion tank 60 for storing an aqueous dispersion of fluorine-containing polymer particles to be concentrated is communicated with a membrane module 63 through a circulation pump 61, a pressure gauge 62 for measuring an inlet pressure of the membrane and a dispersion feeding pipe 70. The membrane module is connected to dispersion feeding pipes 70 and 71 so as not to cause leakage of the dispersion like the ceramic micro filtration membrane 30 in FIG. 2. Also the membrane module 63 is communicated with the virgin dispersion tank 60 through a pressure gauge 64 for measuring an outlet pressure of the membrane, a valve 65 and a dispersion feeding pipe 71. Further a dispersion feeding pipe 72 provided with a valve 66 which is closed normally is connected to a vessel 67 for receiving a concentrated dispersion obtained by filtrating with the membrane module 63.

In the concentrating operation, firstly an aqueous dispersion A to be concentrated is put in the virgin dispersion tank 60 and the circulation pump 61 is actuated to feed the aqueous dispersion A to be concentrated to the membrane module 63. The concentrated aqueous dispersion was drawn out into the vessel 67 by opening the valve 66. A portion of the dispersion which had not been concentrated in the membrane module 63 is returned to the tank 60 through the dispersion feeding pipe 71.

Comparative example 3

In the concentrating system shown in FIG. 3, concentration was carried out with about 20 liters (24 kg) of the aqueous dispersion of PTFE which was prepared in Example 1 by using the ceramic micro filtration membrane module (pore size: 0.2 μm) (pore size/average particle size=0.71) of Example 1 as the membrane module 63 and a centrifugal pump (available from Mikuni Kikai Co., Ltd.) was used as the circulation pump 61.

The circulation of the aqueous dispersion was carried out with the average filtration pressure of about 0.12 MPa (Pin=0.15 MPa, Pout=0.09 MPa) and the flow rate of the circulating aqueous dispersion of PTFE of about 20 liters/ minute (linear velocity: 2.2 m/sec). PTFE began to be fibrilated due to a shearing force generated at moving parts and sealing parts of the pump, and clogging of the filtration membrane occurred due to the fibrilated PTFE. Thus the operation became impossible. In the obtained concentrated dispersion, fibrilated PTFE was observed.

Comparative example 4

In the concentrating system shown in FIG. 3, concentration was carried out with about 400 g of an aqueous dispersion of FEP (average particle size: about 0.15 µm) by using the ultrafilter membrane (nominal separable molecular weight: 300,000) (pore size/average particle size=4.7×10$^{-2}$) of Comparative Example 1 as the membrane module 63 and a tubular pump (available from Nippon Millipore Co., Ltd.) was used as the circulation pump 61.

The average filtration pressure was adjusted to about 0.5 MPa (Pin=0.6 MPa, Pout=0.4 MPa) and the average flow rate of the circulating aqueous disperion of FEP was adjusted to about 0.27 liter/minute. The operation was carried out for about one hour. With a lapse of time, the filtration membrane was clogged due to an accumulated resin and the filtration became impossible. Therefore the concentration was stopped. In the circulating dispersion, coagulated FEP particles were observed, and almost no concentration had been achieved.

Concentrations of the fluorine-containing polymer and surfactant in the concentrated dispersions and filtrate (filtrated aqueous medium containing the surfactant) obtained in Examples 1 to 5 and Comparative Examples 1 to 4, respectively were determined. The results are shown in Table 1.

mer particles containing a surfactant to a micro filtration membrane having a pore size of 0.01 to 1 µm with aqueous dispersion feeding means which does not substantially generate shearing force and, removing an aqueous medium containing the surfactant from the aqueous dispersion, wherein said feeding comprises applying static pressure to said aqueous dispersion.

2. The method of claim 1, wherein the pore size of the micro filtration membrane is 0.2 to 1.5 times the average particle size of the fluorine-containing polymer particles.

3. The method of claim 1, wherein said aqueous dispersion of fluorine-containing polymer particles is flowed in parallel with a surface of the micro filtration membrane.

4. The method of claim 1, wherein the pore size of the micro filtration membrane is from 0.05 to 0.5 µm.

5. The method of claim 1, wherein said aqueous dispersion feeding means is means for giving a force for feeding the aqueous dispersion by putting the dispersion in an airtightly closed vessel and then pressurizing with clean air or inert gas.

6. The method of claim 1, wherein said aqueous dispersion of fluorine-containing polymer particles is an aqueous dispersion of polytetrafluoroethylene and the pore size of the micro filtration membrane is from 0.1 to 0.3 µm.

7. The method of claim 1, wherein said aqueous dispersion of fluorine-containing polymer particles is flowed in parallel with a surface of the micro filtration membrane at a linear velocity of 0.5 to 7 m/sec.

8. A method for concentrating an aqueous dispersion of fluorine-containing polymer particles containing a surfactant, which comprises, in a first closed vessel and second closed vessel in communication with each other through a micro filtration membrane, repeating alternately

TABLE 1

| | Concentrated dispersion | | | Filtrate | |
|---|---|---|---|---|---|
| | Concentration of fluorine-containing polymer (% by weight) | Concentration of surfactant (% by weight) | Coagulated or fibrilated particle | Concentration of fluorine-containing polymer (% by weight) | Concentation of surfactant (% by weight) |
| PTFE | | | | | |
| Before concentration | 30.1 | 8.2 | None | — | — |
| Ex. 1 | 63.2 | 4.0 | None | Not more than 0.01 | 2.2 |
| Ex. 2 | 61.2 | 4.1 | None | Not more than 0.01 | 2.1 |
| Ex. 3 | 61.8 | 4.0 | None | Not more than 0.01 | 2.2 |
| Ex. 4 | 61.8 | 4.0 | None | Not more than 0.01 | 2.1 |
| Ex. 5 | 60.8 | 4.0 | None | Not more than 0.01 | 2.3 |
| Comp. Ex. 1 | | | Concentration was impossible | | |
| Comp. Ex. 2 | | | Concentration was impossible | | |
| Comp. Ex. 3 | 53.0 | 3.9 | Found | Not more than 0.01 | 2.2 |
| FEP | | | | | |
| Before concentration | 30.1 | 6.0 | None | — | — |
| Comp. Ex. 4 | | | Concentration was impossible | | |

According to the concentration method of the present invention, energy consumption and cost can be reduced, various kinds of surfactants can be used and the amount of the sufactant can be reduced. Also the concentration period of time can be shortened, and the method can be applied to a fluorine-containing polymer such as PTFE which is easily fibrilated.

What is claimed is:

1. A method for concentrating an aqueous dispersion of fluorine-containing polymer particles, which comprises feeding the aqueous dispersion of fluorine-containing polythe following steps until a desired concentration of the aqueous dispersion is obtained;

feeding the aqueous dispersion of fluorine-containing polymer particles containing the surfactant from the first closed vessel to the second closed vessel with aqueous dispersion feeding means which does not substantially generate shearing force and feeding the aqueous dispersion from the second closed vessel to the first closed vessel with the aqueous dispersion feeding means.

9. The method of claim 8, wherein said feeding comprises applying static pressure to said aqueous dispersion.

10. The method of claim 8, wherein said aqueous dispersion feeding means comprises means for giving a force for feeding the aqueous dispersion by putting the dispersion in an airtightly closed vessel and then pressurizing with clean air or inert gas.

11. The method of claim 8, wherein said micro filtration membrane has a pore size of 0.01 to 1 μm.

* * * * *